United States Patent Office 3,051,760
Patented Aug. 28, 1962

3,051,760
METHOD OF PURIFICATION AND CRYSTALLIZATION OF 2,2'-ISOPROPYLIDENE BIS(p-PHENYLENEOXY)DIETHANOL
Arthur R. Sexton, Midland, Mich., assignor to The Dow Chemical Company, Midland, Mich., a corporation of Delaware
No Drawing. Filed Oct. 10, 1958, Ser. No. 766,415
2 Claims. (Cl. 260—613)

The present invention relates to a new and useful process for the reduction of residual catalyst and crystallization of the 2,2'-isopropylidene bis(p-phenyleneoxy)diethanol and is more particularly concerned with a new and useful method whereby the subject compound can be produced in a fine-crystalline form substantially free from residual catalyst.

The known method for handling 2,2'-isopropylidene-bis(p-phenyleneoxy)diethanol is to cast the crude product in drums directly from the reactor and permit the material to solidify. Another method is to crystallize the material on a drum flaker. The casting method requires considerable time and expense and the product is not pure, i.e., contains alkaline catalyst, unreacted phenol, etc., and further is not in a readily usable or desirable form, since melting of the contents of the drum or crushing is necessary before use. The drum flaker method does not produce a good quality flake, i.e., the flake being somewhat tacky and not free-flowing and the equipment for flaking is excessively large, therefore costly and must be controlled within a very narrow temperature range to produce a commercially usable material.

It is, therefore, an object of the present invention to provide a product containing considerably less alkaline catalyst and in the finely divided form by an inexpensive and simple technique. These and other advantages will become apparent from the following specification.

It has now been found that the contacting of the crude product of the reaction of a bisphenol and ethylene oxide (as described in U.S. Patent 2,331,265) with water at a temperature between about 0° and 75° C. while rapidly agitating the water causes the product to rapidly crystallize in fine granular powder form. It is preferable that the crude product be introduced into the crystallization zone immediately from the reaction zone.

The following example illustrates the present invention but is not to be construed as limiting.

Example 1

Bisphenol A (18 moles, 4100 g.), 38.9 moles (1710 g.) of ethylene oxide, and 17 g. of sodium hydroxide catalyst were placed in an 8-liter stainless steel kettle, and heated to 50° C. with agitation to dissolve the Bisphenol A. The resulting mixture was pumped through a steam-heated coil (20 ft. of 0.25 in. pipe) at 140–150° C. over a 6-hour period. The product was passed into a 10 gal. can equipped with an agitator and containing 12 l. of water at 25° C. The product crystallized as soon as it contacted the water, giving a fine white granular product. The dry product weighed 5800 g., representing a yield of 96.0 percent of theoretical; melted at 102.6–109.8° C.; and had an APHA color index of 43 in a 25% 2-B ethanol sol.

The alkaline catalyst remaining in the product obtained by the method of the present invention compared with products prepared by crystallizing on stainless steel plates and flaked is shown in the following table:

| | Percent alkaline catalyst remaining in product |
|---|---|
| Solidified on stainless steel plates | 0.3 |
| Crystallized in rapidly agitated water at 25 degrees | 0.05 |

We claim:
1. A method for the purification and crystallization of 2,2'-isopropylidene bis(phenyleneoxy)diethanol which comprises introducing a crude molten 2,2'-isopropylidene-bis(phenyleneoxy)diethanol product into water maintained at a temperature between about 0° and about 75° C. while rapidly agitating the water, and recovering the so purified and crystallized product.
2. In the process of claim 1 wherein the water is maintained at a temperature of between about 20° and about 50° C.

References Cited in the file of this patent
UNITED STATES PATENTS

| 2,331,265 | Coleman et al. | Oct. 5, 1943 |
| 2,902,518 | Hurdis et al. | Sept. 1, 1959 |

FOREIGN PATENTS

| 711,122 | Great Britain | June 23, 1954 |

OTHER REFERENCES

Weissberger: Technique of Organic Chemistry, vol. III (1950), p. 448. (Copy in Lib.)